(No Model.) 2 Sheets—Sheet 1.
F. PURDON, H. E. WALTERS & W. H. WOODCOCK.
ROLLER BEARING.

No. 490,859. Patented Jan. 31, 1893.

Witnesses
Arthur Woodman
W. B. Sandy

Inventors
Frederick Purdon
Harry E. Walters
W. Hugh Woodcock
per John P. O'Donnell
Attorney (No Model.) 2 Sheets—Sheet 2.
F. PURDON, H. E. WALTERS & W. H. WOODCOCK.
ROLLER BEARING.

No. 490,859. Patented Jan. 31, 1893.

United States Patent Office.

FREDERICK PURDON, HARRY ERNEST WALTERS, AND WILLIAM HUGH WOODCOCK, OF LONDON, ENGLAND.

ROLLER-BEARING.

SPECIFICATION forming part of Letters Patent No. 490,859, dated January 31, 1893.

Application filed November 27, 1891. Serial No. 413,272. (No model.) Patented in England April 21, 1891, No. 6,860.

*To all whom it may concern:*

Be it known that we, FREDERICK PURDON and HARRY ERNEST WALTERS, residing at 2 Great George Street, Westminster, London, in the county of Middlesex, and WILLIAM HUGH WOODCOCK, residing at 23 Auckland Hill, West Norwood, London, in the county of Surrey, England, civil engineers, and subjects of the Queen of Great Britain and Ireland, have invented certain new and useful Improvements in Roller-Bearings; and we do hereby declare the following to be a full, clear, and exact description of the invention, such as will enable others skilled in the art to which it appertains to make and use the same.

Letters Patent for this invention have been obtained in England, No. 6,860, dated April 21, 1891.

This invention relates to roller bearings; and it consists in the novel construction and combination of the parts hereinafter fully described and claimed.

Figure 1:
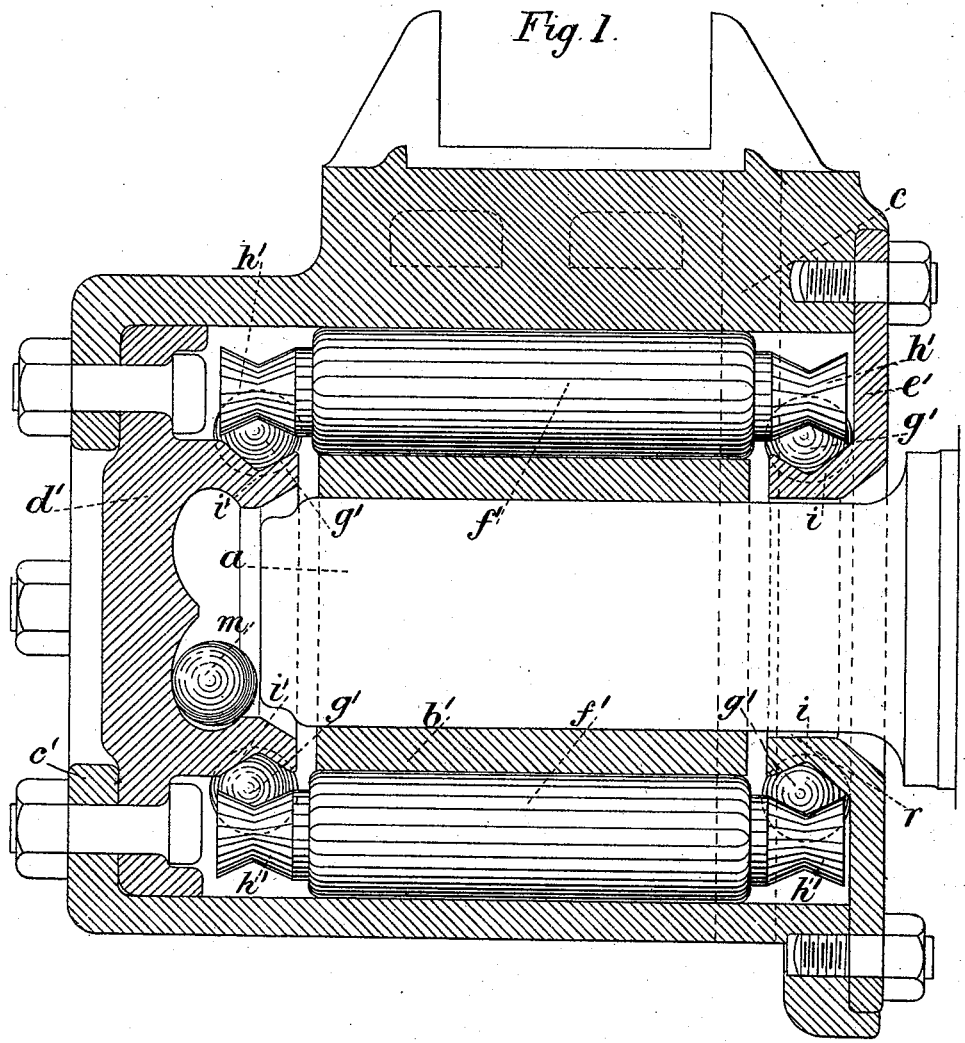
Figure 2:
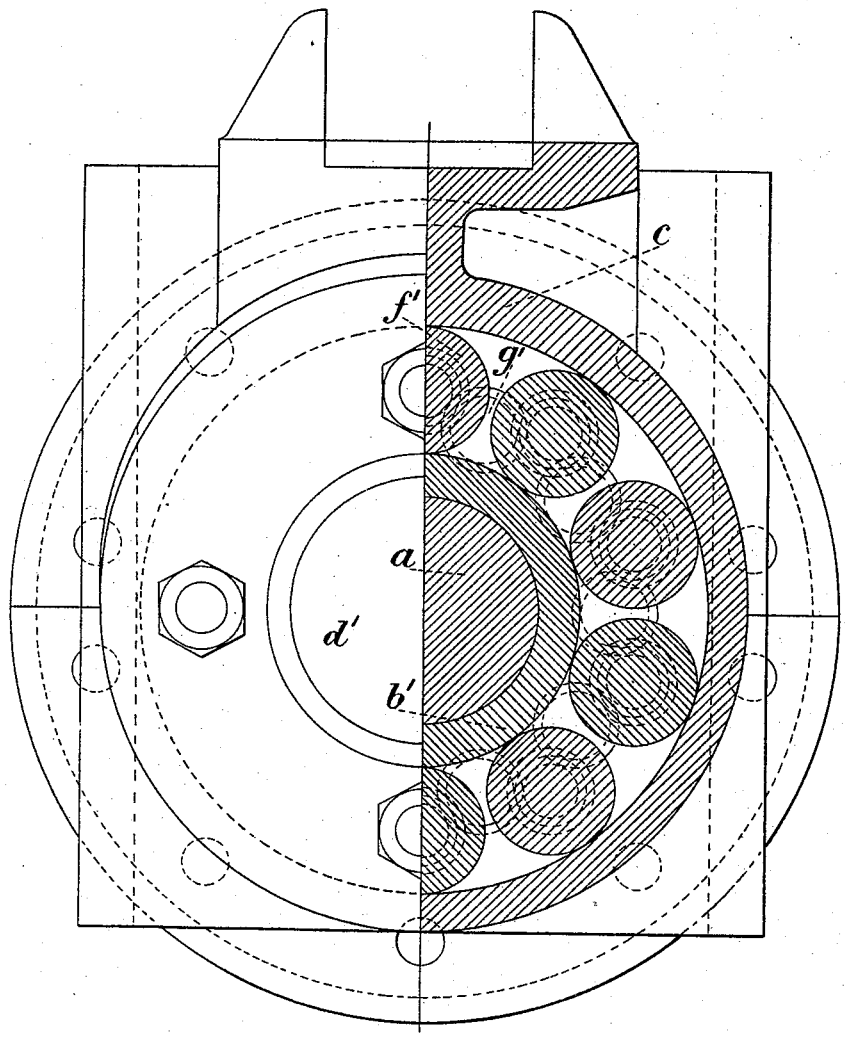

In the drawings: Figure 1 is a longitudinal section through a bearing constructed according to this invention. Fig. 2 is an end view, one half in section.

The axle end $a$ is provided with a cylindrical sleeve $b'$ which is firmly secured to it, but this sleeve may be dispensed with if desired. The axle-box $c$ is provided with a cylindrical chamber, the rear end of which is covered by the cover $e'$ which is provided with a hole $r$ for the axle to pass through. The rear cover $e'$ is provided with a circular V-shaped groove $i$, and is securely bolted to the axle-box. A front cover $d'$ is securely bolted to the front end of the axle-box, and is provided with a circular V-shaped groove $i'$ of the same diameter as the groove $i$. The front cover is also provided with a central grooved chamber and a ball $m$ running in the chamber and adapted to receive the end thrust of the axle. The cover $d'$ is circular and is slid within the chamber of the axle-box and bolted to the end flange $c'$.

A series of rollers $f'$ is interposed between the sleeve $b'$ and the inner face of the axle-box chamber. These rollers $f'$ have grooved ends $h'$ of smaller size than the rollers. Balls $g'$ are interposed between the grooved ends $h'$ of the rollers and run in the said grooves $i\ i'$ of the covers. These balls are kept in position in the grooves by the grooved ends $h'$, and the whole device forms a practically dust-proof and frictionless bearing.

What we claim is:

The combination, with the axle and its bearing sleeve $b'$, of the axle-box having a cylindrical chamber and the end flange $c'$, the front end cover slid within the said chamber and secured to the end flange and provided with the groove $i'$, the rear end cover encircling the axle and secured to the axle-box and provided with the groove $i$, the rollers $f'$ provided with grooved ends and arranged within the said chamber, and the balls running between the said grooved ends in the said grooves $i$ and $i'$, substantially as and for the purpose set forth.

In testimony whereof we affix our signatures in presence of two witnesses.

FREDERICK PURDON.
HARRY ERNEST WALTERS.
WILLIAM HUGH WOODCOCK.

Witnesses:
T. LENNOX IVAN,
CHAS. ROCHE.